July 24, 1956 P. L. TORRE 2,756,070
SPRING SUSPENSION SYSTEM FOR MOTORCYCLE FRONT WHEELS
Filed April 13, 1951
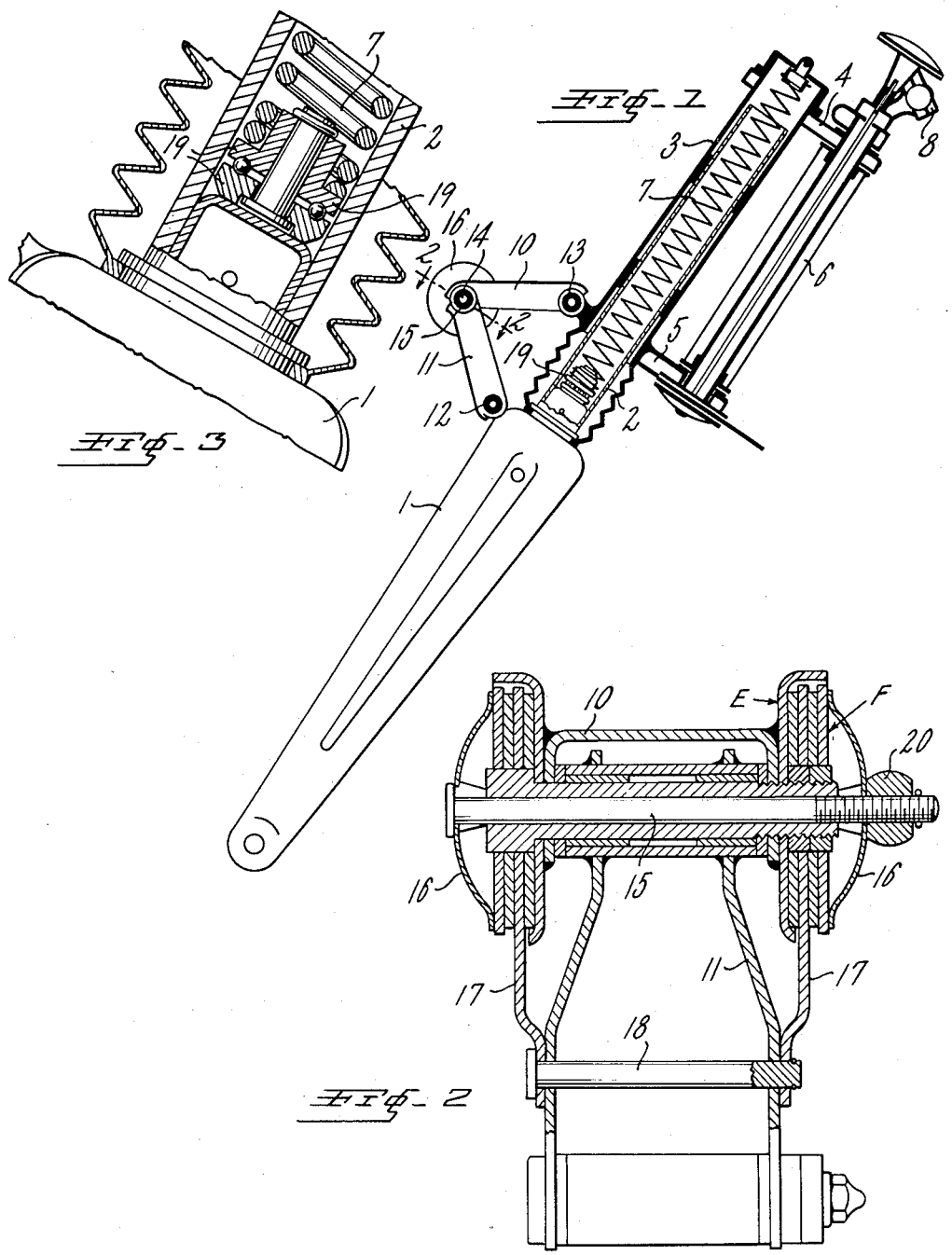
INVENTOR.
PIER LUIGI TORRE
BY Leon M. Strauss
AGT.

United States Patent Office 2,756,070
Patented July 24, 1956

2,756,070

SPRING SUSPENSION SYSTEM FOR MOTORCYCLE FRONT WHEELS

Pier Luigi Torre, Milan, Italy

Application April 13, 1951, Serial No. 220,761

Claims priority, application Italy April 14, 1950

1 Claim. (Cl. 280—276)

The present invention relates to a spring suspension system for motorcycle front wheels with telescoping arrangement and shock-absorbing and guiding members.

Heretofore, the suspension for the front wheel of a motorcycle was obtained by means of a telescoping fork, comprises in general two rods axially displaceable relative to each other between which there were inserted springs or other elastic members. The two rods serve to reinforce transversely the wheel and its fork, which in turns must be able to rotate about the steering column. These spring suspension systems are rather complicated and therefore expensive.

It is an object of the present invention to provide a resilient suspension system for mounting the front wheel fork of a motorcycle which obviates at least some of the aforesaid difficulties.

It is another object of the present invention to provide a front wheel spring suspension system which is exceptionally simple in construction and cheap to manufacture.

It is a further object of the present invention to provide a resilient suspension system which provides axially adjustable support of the front wheel fork of a motorcycle, while maintaining the steering column and the wheel fork in predetermined alignment relative to each other.

The above objects will be best understood by reference to the following detailed description of an illustrative embodiment when taken in conjunction with the drawing, wherein:

Fig. 1 is an elevational view of the spring suspension system of the present invention with parts cut away and shown in section;

Fig. 2 is an enlarged transverse section taken along lines 2—2 of Fig. 1.

Fig. 3 is a fragmentary and enlarged vertical section through the ball bearing seat means, seen in Fig. 1.

Referring now more specifically to the drawing there is illustrated the resilient suspension system of the present invention for mounting the wheel fork 1 and the steering post or column 6 for axial movement relative to each other. The system includes a central bushing 2 which is carried by the wheel fork 1 and slidably retained within cylindrical guide member or sleeve means 3. The guide member or sleeve means is formed with two laterally projecting extensions 4, 5 having aligned bearings thereon for rotatably supporting the steering post or column 6.

A resilient suspension member, illustrated in the present embodiment by the spring 7 is inserted between the bushing 2 and an end cap of the cylindrical guide member or sleeve means 3.

As is apparent upon consulting Fig. 1 the lower end of spring 7 does not rest directly upon the bottom of the central bushing but instead rests upon rotatable seat means in the form of a ball bearing 19, which has been diagrammatically illustrated and is provided for a purpose to be subsequently described.

Rigidly secured to the upper lateral extension 4 of the guide member 3 is a support 8 for a steering member, the latter being constructed and arranged in accordance with principles and practices which are understood per se. Accordingly a detailed description of the steering mechanism is dispensed with as superfluous.

Operatively connected to the guide member 3 and to the steering fork 1 is a shock-absorbing and guiding mechanism which damps the reaction of the spring 7 and maintains the guide member 3 against rotation relative to the bushing 2 and steering fork 1. This mechanism includes two legs or linkage members or link elements 10, 11, the element 10 being pivotally connected by pivot 13 to the guide member 3 and the leg 11 being pivotally connected by the pivot 12 to the steering fork 1.

The linkage members or elements 10 and 11 are pivotally connected together on axis 14 by means of a pin 15 at their other ends. A frictional type shock-absorber whose axis 14 is located substantially level with said ball bearing seat means 19, preferably includes two elastic washers 16 and a complementary pair of central or inner friction disks 17 is provided for interconnecting linkage members 10 and 11. As illustrated, the friction disks 17 may be fixed to the linkage member 11 by means of a locking member or pin 18 while the washers or friction disks 16 are mounted on pin 15. Pin 15 further carries two pairs of friction disks E and F between which the respective disks 17 are mounted, friction disks E being coupled with the linkage arm 10, as shown.

As is well understood, this type of shock-absorbing arrangement includes confronting and abutting contact surfaces in frictional engagement with each other and movable relative to each other in response to pivotal movement of the linkage members 10, 11. Friction disks 17, E, and F are adjustable on pin 15 relative to each other, as by means of an adjustable clamping nut 20, and constitute a shock-absorbing unit for braking the back stroke or recoil of the spring 7 and to assure proper cushioning of the resilient suspension.

In operation the spring 7 resiliently supports the wheel fork 1 while permitting axial displacement with respect to sleeve member 3 and steering post 6 while simultaneously maintaining said sleeve member (and said steering post) in predetermined angular alignment with respect to wheel fork 1; and the interconnected shock-absorbing unit damps the reaction of the spring 7 and maintains the guide member 3 against rotation relative to the bushing 2.

As has been previously pointed out, the lower end of spring 7 rests upon the upper ring portion of rotatable seat means, such as the ball bearing 19, provided with a base portion suitable secured to bushing 2. The latter arrangement is an important feature of the invention and prevents the transmission of undesirable torque stresses to wheel fork 1 and sleeve member 3 and the arms 10 and 11 of the shock absorbing assembly, the torque stresses being generated during alternate compression and expansion of spring 7.

It will be further observed that due to the fact axis 14 of shock-absorbing unit or coupling means lies substantially level with ball bearing seat 19 a particular durable and strong suspension system is achieved, which affords improved operation as it avoids torsion stresses for spring 7, resulting from alternate compression and expansion of said spring, as the wheel fork resiliently responds to irregularities in the road surface. Thus vibrations and wear are held to a minimum and riding comfort is maintained at an optimum. While a preferred embodiment of the invention has been shown and herein described, it will be understood that the same is capable of modifications without departure from the general scope and spirit of the invention as defined in the claim.

Having thus described the invention, what is claimed as new and desired to be secured by Letters Patent, is:

In a suspension system for mounting the wheel fork of a motorcycle for axial displacement with respect to the steering column while said steering column and said wheel fork are maintained in predetermined alignment relative to each other; fixed sleeve means spaced from said steering column and supporting the latter and disposed substantially coincident with the direction of axial displacement of said wheel fork, a bushing rigidly attached to said wheel fork and slidably retained within said sleeve means, rotatable ball bearing seat means carried by said bushing therewithin and adjacent one end thereof, spring means in free operative engagement with one of its ends on said rotatable seat means and surrounded by said sleeve means, the other end of said spring means being operatively connected to said sleeve means at a location remote from said seat means and beyond the other end of said bushing, whereby transmission of undesirable torque stresses to said wheel fork and sleeve means resulting from alternate compression and expansion of said spring means is substantially prevented, linkage means comprising link elements each having two ends, one end of one link element being pivotally connected to said wheel fork, one end of another link element being pivotally connected to said sleeve means, friction means connected to the other ends of said link elements, respectively, and means pivotally coupling said other ends of said link elements, whereby through said linkage means a damping movement is established between said fork and said column, said coupling means being located substantially in alignment with said seat means and substantially midway between said one end of said one link element connected to said fork and said one end of said other link element connected to said sleeve means.

References Cited in the file of this patent

UNITED STATES PATENTS

| | | |
|---|---|---|
| 1,025,388 | Finnell et al. | May 7, 1912 |
| 1,188,168 | Genovese | June 20, 1916 |

FOREIGN PATENTS

| | | |
|---|---|---|
| 7,845 | Great Britain | of 1909 |
| 212,358 | Great Britain | Mar. 13, 1924 |
| 295,134 | Great Britain | Aug. 9, 1928 |
| 416,594 | Great Britain | Sept. 18, 1934 |
| 400,163 | Italy | Nov. 25, 1942 |
| 415,980 | Italy | Nov. 12, 1946 |